July 7, 1942.  D. G. C. LUCK  2,288,815
OMNIDIRECTIONAL RADIO RANGE
Filed Sept. 28, 1940   3 Sheets-Sheet 1
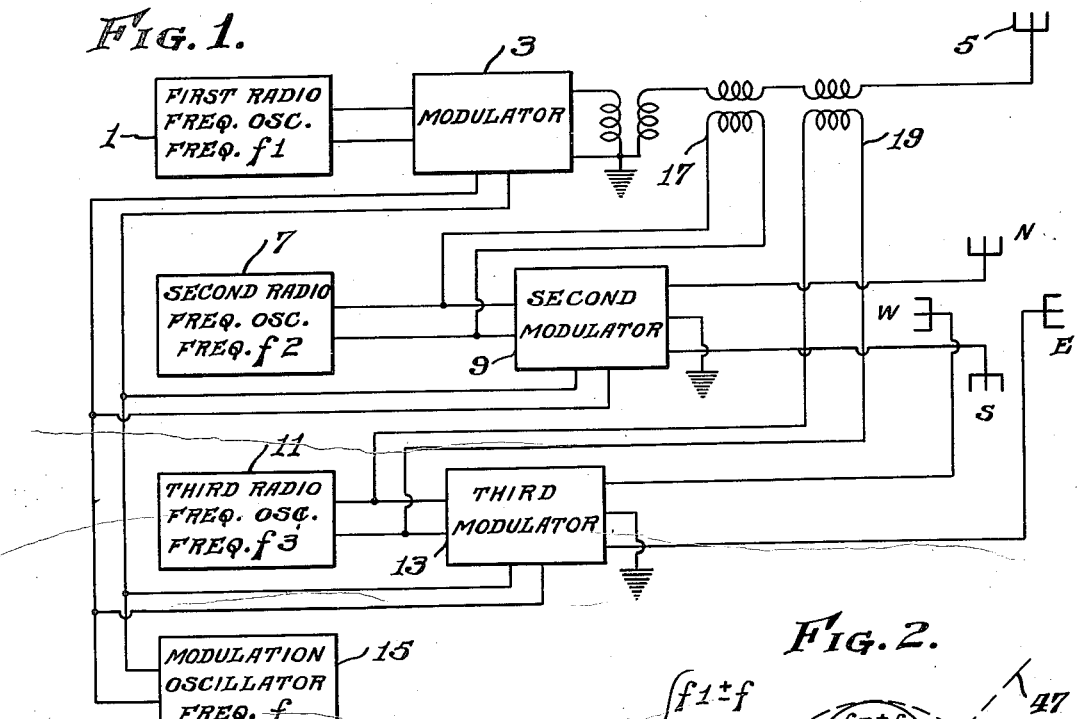
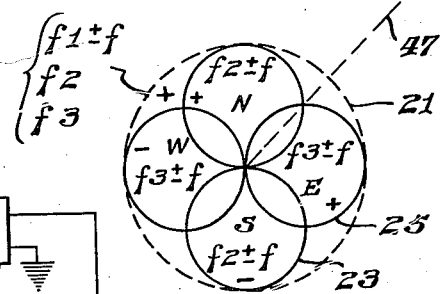
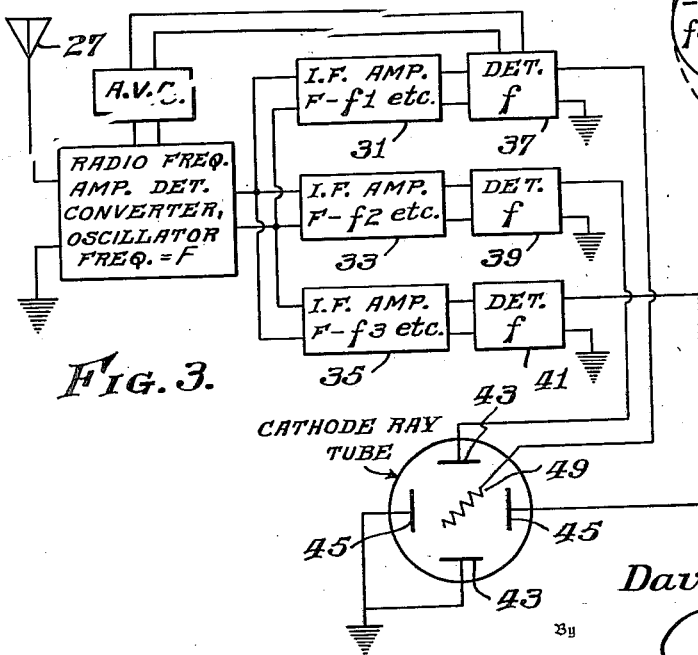
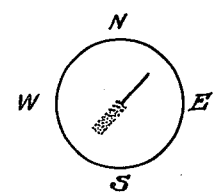
Inventor
David G. C. Luck
By
Attorney Inventor
David G. C. Luck July 7, 1942.                D. G. C. LUCK                 2,288,815
                       OMNIDIRECTIONAL RADIO RANGE
                  Filed Sept. 28, 1940        3 Sheets-Sheet 3
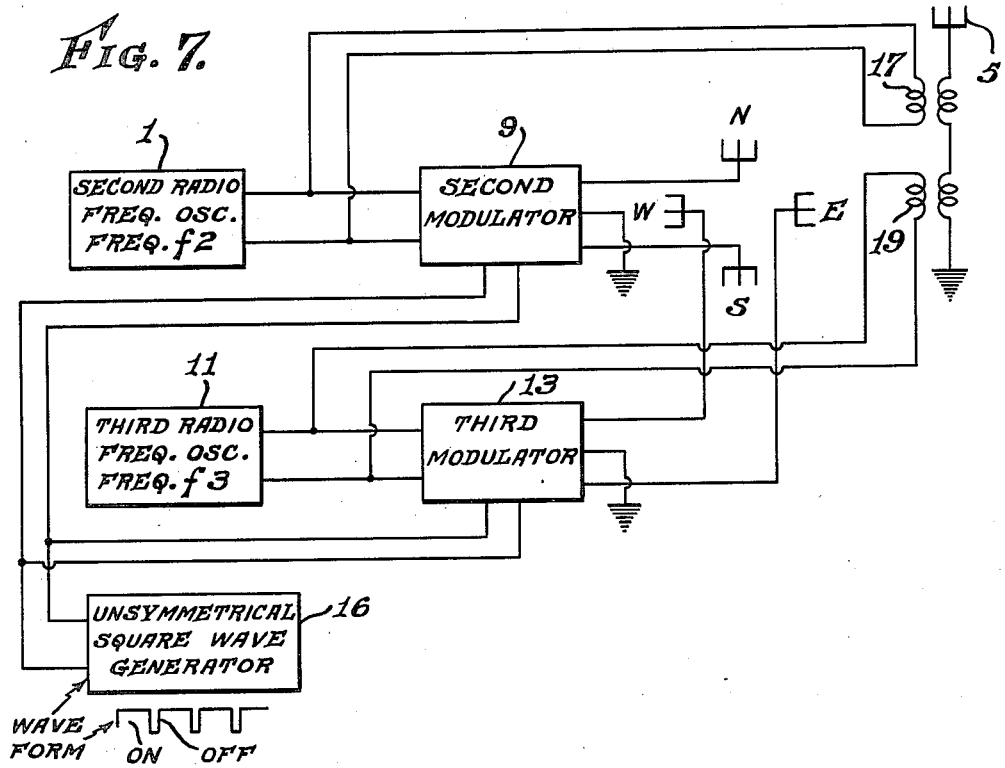
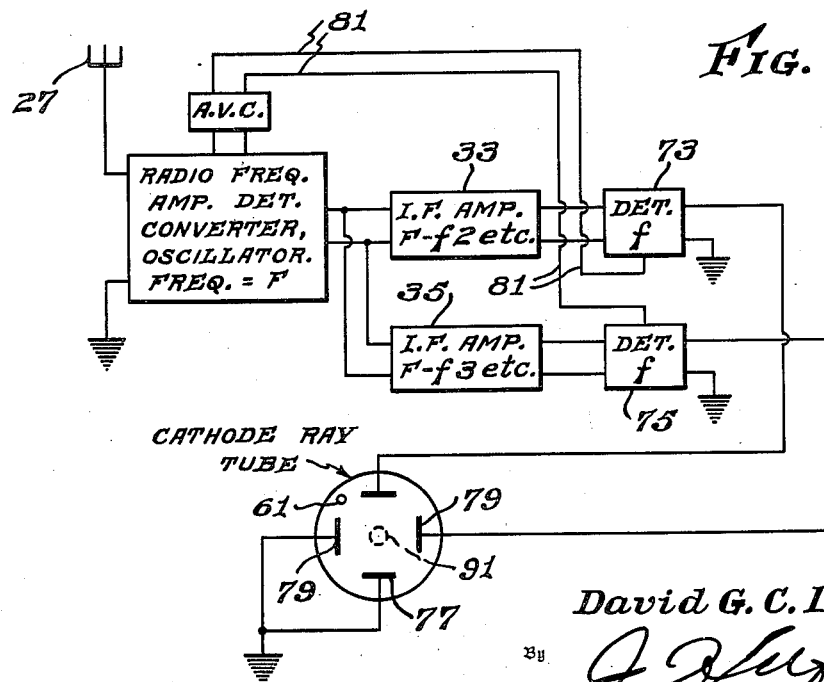
Inventor
David G. C. Luck
By
Attorney Patented July 7, 1942

2,288,815

UNITED STATES PATENT OFFICE 2,288,815

OMNIDIRECTIONAL RADIO RANGE

David G. C. Luck, Haddon Heights, N. J., assignor to Radio Corporation of America, a corporation of Delaware Application September 28, 1940, Serial No. 358,771

10 Claims. (Cl. 250—11)

This invention relates to an omnidirectional radio range and, more particularly, to a radio range in which carrier waves of different frequencies are modulated by a common signal frequency and are radiated to establish respectively a nondirectional field and pair of differently oriented directive fields. The relative amplitudes of the several fields indicate the bearing of a nondirectional receiver, responsive to the fields, with respect to the radio range transmitter.

Omnidirectional radio beacons have been described in which a nondirectional field and a rotating field are established. In this type of beacon, the phase of the currents derived from the two fields is compared by means including a nondirectional receiver to indicate the bearing of the receiver with respect to the transmitter. A type of radio range is also used to establish several courses, which are fixed with respect to the earth. In this latter type of radio range, overlapping directional fields are distinctively modulated. A receiver responsive to the fields produces output signals corresponding to the distinctive modulation. An aircraft pilot, observing the signals, may follow an equisignal path which corresponds to the desired course.

In the present invention, means are provided for establishing an infinite number of courses about a radio range without employing the rotating fields and phase comparison or equisignal methods of the prior art. The system has the advantage of simplification with respect to the rotating beacon and does not have the disadvantage of the limited numbers of courses established by the conventional radio ranges. It is one of the objects of the invention to provide means for producing a radio range with an infinite number of courses. Another object is to provide means for establishing a radio range in which the courses are not ambiguous. Another object is to provide means for radiating waves of different frequencies bearing the same modulation signal to establish a nondirective field and a pair of differently directive fields. A further object is to provide means for indicating the bearing of a receiver, responsive to the fields, with respect to the transmitter as a function of the relative amplitudes of the several fields.

Figure 5:
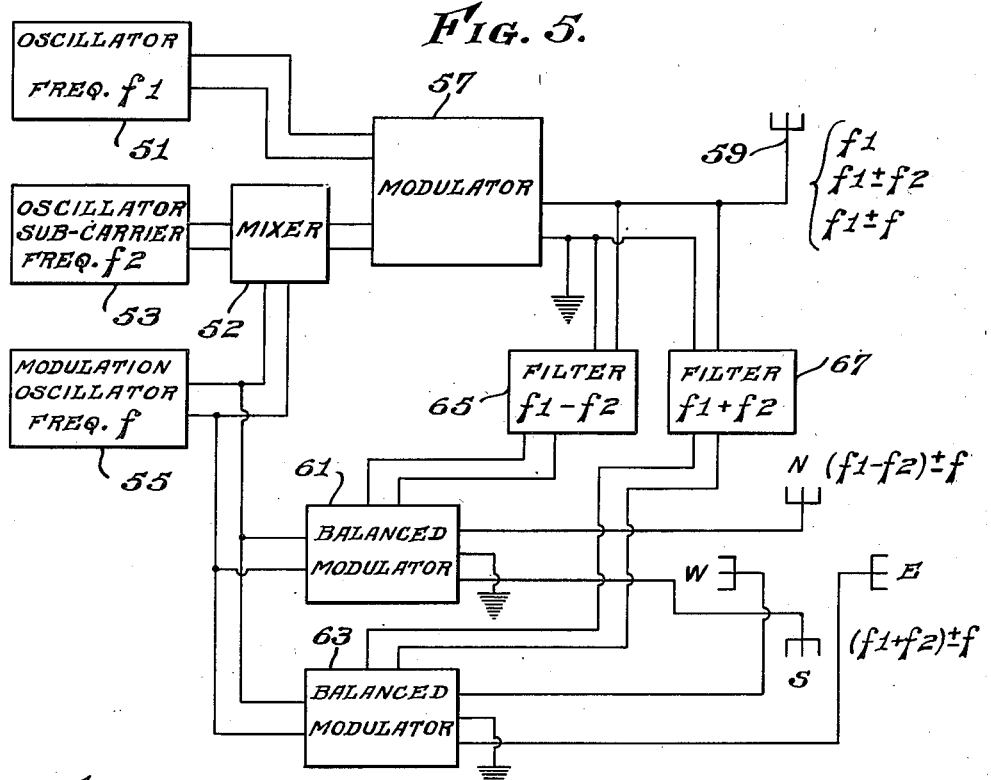
Figure 6:
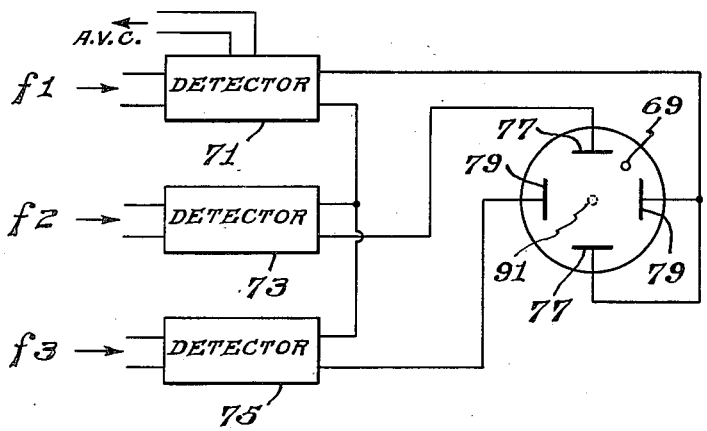

The invention will be described by referring to the accompanying drawings in which Figure 1 is a block diagram of one embodiment of the radio range transmitter of the invention; Figure 2 is a graphic representation of the fields established by the transmitter; Figure 3 is a block diagram of the receiver of the invention; Figure 4 is a graphic illustration of the receiver indicator; Figures 5 and 6 are block diagrams of a modified transmitter and a portion of a modified receiver, respectively; Fig. 7 is a diagram of a modified transmitter; and Fig. 8 is a diagram of a modified receiver.

Referring to Fig. 1, a first radio frequency oscillator 1 is connected through a modulator 3 to an omnidirectional antenna 5. A second radio frequency transmitter 7 is connected through a second modulator 9 to directive antennas N, S which, suitably energized, establish a figure 8 field. A third radio frequency oscillator 11 is connected through a third modulator to an antenna array E, W, which also has a figure 8 directive pattern. The antennas NS and EW are preferably oriented so that one pair NS lie on a line extending from north toward south, and the other pair EW lie on a line extending from east toward west. Other orientations may be used.

The three modulators are connected to a modulation oscillator 15, which applies the signal frequency currents to the several carrier currents. The second and third modulators may be of the balanced modulator type, although it is not essential to suppress the carriers $f2$, $f3$ which are radiated from the nondirectional antenna 5 after the carrier currents are applied thereto by transformers 17, 19, which are suitably connected to the second and third oscillators.

The operation of the transmitter is as follows: If $f1$, $f2$ and $f3$ are the three radio frequency carriers and $f$ is the signal modulation, $f1 \pm f$, $f2$ and $f3$ are radiated from the nondirectional antenna, as shown in Fig. 2 by the broken circular line 21. The antennas N and S establish the figure 8 field 23 which includes $f2 \pm f$. The antennas E and W establish the figure 8 field 25 which includes $f3 \pm f$. The phase of the radio frequency fields of the same frequency is the same. Instantaneous polarities are shown by the plus and minus symbols. It will be noted that the modulation envelopes of the omnidirectional field and the directional fields in the north and east quadrants are in phase. The modulation envelopes of the omnidirectional field and the directional fields in the south and west quadrants are out of phase. This phase relationship provides means for sense indication and the relative amplitudes of these envelopes of the directional fields indicates direction as will hereinafter appear.

The receiver is shown in Fig. 3. A nondirectional antenna 27 is connected through a radio frequency amplifier, detector and converter 29 to three intermediate frequency amplifiers 31, 33, 35 which are responsive respectively to the intermediate frequency carrier currents $(F-f1)$, $(F-f2)$ and $(F-f3)$ plus their side bands due to modulation frequency $f$. The intermediate frequency currents are applied to detectors 37, 39, 41, respectively, which demodulate the intermediate frequency currents to produce the currents of signal frequency $f$. The relative amplitudes of the separate currents in the detectors will depend solely upon the position of the receiver in the ratio range fields, provided the relative amplitudes of the currents corresponding to the directive fields have been kept equal in the range transmitter and provided the relative sensitivity of the two channels of the receiver responsive to the directive fields has been maintained equal.

The voltages derived from the detector 39 connected to the intermediate frequency amplifier 33 are applied to the vertical deflecting electrodes 43 and the voltages derived from the detector 41 connected to the intermediate frequency amplifier 35 are applied to the horizontal deflecting electrodes 45. Since the modulation currents $f$ are derived from a common source and are applied to both carriers $f2$ and $f3$ without phase shift, it follows that the demodulated currents will be in phase, provided there is no relative phase shift in the receiver channels. The relative amplitudes of the voltages from the detectors will depend upon the receiver location with respect to the transmitter and hence the cathode ray beam will be deflected along a line at an angle corresponding to bearing of the receiver from the transmitter.

For example, if the receiver lies along the dash line 47 of Fig. 2, equal currents will be received and equal voltages will be applied to deflect the cathode ray along a line at 45° with respect to the vertical line extending from one vertical deflecting electrode to the other 43, 43. This line will lack "sense" because the receiver might be either northeast or southwest of the range. To provide a sense indication, the currents from the first intermediate frequency amplifier 31 are demodulated to provide a reference voltage which is applied to the control electrode 49. This voltage dims (or defocuses) the ray during half its excursion as shown in Fig. 4.

If the receiver were north of the range, the receiver would respond only to the omnidirectional field $(f1\pm f)$ and $(f2)$ and to the single directional field $f2\pm f$. The received currents would deflect the cathode ray along a vertical line and would defocus the lower half to provide sense.

Instead of using the carrier frequencies $f1$, $f2$ and $f3$, the currents of two frequencies $f1$ and $f2$ may be beat against each other to form upper and lower side bands in the circuit arrangement shown in Fig. 5 in which the carrier and subcarrier sources are oscillators 51, 53, respectively. The currents from the carrier source 51 and from the mixer 52, which is a linear device, are applied to a modulator 57 which is connected to an omnidirectional antenna 59. Currents from a modulation oscillator 55 and the subcarrier source 53 are superimposed in the mixer 52. The output from the modulator 57 includes currents of frequencies $f1$, $f1\pm f2$, and $f1\pm f$. The modulation oscillator is also connected to a pair of balanced modulators 61, 63. The balanced modulators are connected through filters 65, 67, respectively, to the output of the modulator 57. The filters are designed to pass respectively currents corresponding to the difference and sum of the carrier 51 and subcarrier 53 oscillator frequencies; i. e., currents of frequency $f1-f2$ and $f1+f2$. These currents are applied to the balanced modulators 61, 63, respectively. The outputs of the balanced modulators are applied to the antennas NS and EW. The same type of receiver and indicator are used for reception but with the three intermediate channels tuned to respond respectively to the carrier currents $f1$, $f1+f2$, and $f1-f2$, as well as their side bands.

It is practical to omit all the modulators of Fig. 1 and to use the rectified carriers to deflect the cathode ray spot 69 as shown in Fig. 6. In this case, the detector outputs 71, 73, 75, are connected so that the voltages corresponding to the carriers $f1$ and $f2$ are added algebraically, and are applied to the vertical deflection electrodes 77 and $f1$ and $f3$ are added algebraically and are applied to the horizontal deflection electrodes 79, respectively. The cathode ray deflection will appear as a spot. The outer portion of the cathode ray screen may be marked as a compass card to indicate bearing. The antenna and intermediate channels of the modified receiver are similar to the arrangement of Fig. 3. The modified receiver will also respond to the modified transmitter of Fig. 5, if the modulation oscillator 55 and modulators 61, 63 are omitted.

A third modification of the system, which has the advantage of using only two channels, may be had by omitting the first radio frequency oscillator 1 of Fig. 1 and its associated modulator 3 as shown in Fig. 7. In this case, the modulation oscillator 16 is designed to produce an unsymmetrical square wave of the type supplied by a commutator and preferably of low frequency. The modulation oscillator thus keys both directive outputs on for about 90% of the time and off for the remaining 10% by means of the modulators 9, 13.

For receiving, the detector system of Fig. 6 is used without employing the detector 71 and the intermediate frequency channel connected thereto. In this case as shown in Fig. 8, the AVC is derived from the combined outputs of the detectors 73, 75 as indicated by the lines 81. The cathode ray tube includes the normal centering means, which is not shown because it is well known. The centering means is adjusted to maintain the cathode ray spot 91 at the center of the tube screen during the 10% interval when the transmission is omnidirectional only. With the transmission modulation rate of the order of thirty or more per second, the receiving indicator will show two steady spots; one bright, the other dim in proportion to the relative on and off periods of the transmitter. The dim spot 91 corresponding to equal signal strengths transmitted on both channels permits adjustment of the relative gain of the two receiver channels to equality at any time.

Thus, the invention has been described as an omnidirectional radio range in which an infinite number of courses are established. The range transmitter is arranged to establish an omnidirectional field of one frequency and two differently oriented directive fields of two different frequencies. The directive fields are maintained so that they produce equal signals along their lines of maximum field strength. The received signals are applied to a device with three channels tuned respectively to currents including frequencies reprsenting the fields. The currents in the channels ar demodulated and applied to a cathod ray tube to deflect the cathode ray and to form on the fluorescent screen a trace indicating the bearing of the receiver with respect to the radio range transmitter. The method of establishing courses and of indicating bearings may be practiced by different transmitting and receiving systems.

I claim as my invention:

1. An omnidirectional radio range including means for establishing two differently oriented directional radio frequency fields of predetermined strengths, said field including different radio frequencies, and means for establishing a nondirectional radio frequency field including a frequency different from any of said directional field frequencies, said fields having a common center, so that the relative amplitudes of the directional fields determine a bearing line, and the combination of the directional fields and the non-directional field determine the sense of the bearing.

2. An omnidirectional radio range including means for establishing two differently oriented figure 8 radio frequency fields of predetermined strength, said fields including different radio frequencies, means for establishing a nondirectional radio frequency field including a frequency different from any of said figure 8 field frequencies, said fields having a common center so that the relative amplitudes of the figure 8 fields at any point indicate a bearing line through that point and the vectorial combination of the figure 8 fields and the nondirectional field indicates the sense of the bearing, and receiving means responsive to said fields for indicating the bearing of said receiving means as a function of the relative amplitudes of said figure 8 fields and means including said receiving means for combining signals from said figure 8 and said nondirectional fields to indicate the sense of said bearing as a function of the combined signals from the figure 8 and nondirectional fields.

3. An omnidirectional radio range transmitter including means for establishing two differently oriented figure 8 radio frequency fields in which the fields each include a carrier of different frequency and modulation of the same frequency and phase, said modulation being of predetermined relative strength, and means for establishing a nondirectional radio frequency field and including a carrier of a third frequency and modulation of the same frequency and phase as that of the figure 8, said figure 8 fields and said nondirectional field having a common center.

4. An omnidirectional radio range system including means for establishing two figure 8 radio frequency fields in which the major axes intersect and in which the fields each include a carrier of different frequency and modulation of the same frequency and phase, said modulation being of equal strength at equally distant points along said axes and of different relative amplitude at points not equally distant along said axes, means for establishing a nondirectional radio frequency field having its center at said intersection and including a carrier of a third frequency and modulation of the same frequency and phase as that of the figure 8 fields, and receiving means selectively responsive to currents including said carrier frequencies, means for demodulating said modulated carriers, and means for indicating the bearing of said receiving means as a function of the relative amplitude of the demodulated signal and for indicating the sense as a function of the combined signals from said demodulated signal.

5. An omnidirectional radio range transmitter including means including a symmetrical antenna system for establishing a nondirectional radio frequency field including three radio frequencies, means for establishing a figure 8 radio frequency field including a frequency corresponding in frequency to one of said radio frequencies, and means for establishing a second figure 8 radio frequency field differently oriented and including a frequency corresponding in frequency to another of said radio frequencies, said figure 8 fields having predetermined relative strengths.

6. An omnidirectional radio range system including means including a symmetrical antenna system for establishing a nondirectional radio frequency field including three radio frequencies of equal strengths, means for establishing a figure 8 radio frequency field including a frequency corresponding in frequency to one of said radio frequencies, means for establishing a second figure 8 radio frequency field including a frequency corresponding in frequency to another of said radio frequencies, said figure 8 fields being oriented at right angles to each other and having equal strengths, receiving means selectively responsive to said fields including means for rectifying the received signals, and an indicator responsive to the sums of the amplitudes of the nondirectional and of each figure 8 field signal to indicate the bearing and sense of bearing of the receiving means.

7. An omnidirectional radio range transmitter including means including a symmetrical antenna system for establishing a nondirectional radio frequency field including two unmodulated radio frequencies and a third radio frequency including a modulation frequency, means for establishing a figure 8 radio frequency field including a frequency corresponding to one of said unmodulated radio frequencies, modulated by said modulation frequency, and means for establishing a second figure 8 radio frequency field including a frequency corresponding to the other of said unmodulated radio frequencies, modulated by said modulation frequency, said figure 8 fields having equal amplitudes at equally distant points along their axes.

8. An omnidirectional radio range system including means including a symmetrical antenna system for establishing a nondirectional radio frequency field including two unmodulated radio frequencies and a third radio frequency including a modulation frequency, means for establishing a figure 8 radio frequency field including a frequency corresponding to one of said unmodulated radio frequencies, modulated by said modulation frequency, means for establishing a second figure 8 radio frequency field including a frequency corresponding to the other of said unmodulated radio frequencies, modulated by said modulation frequency, said figure 8 fields having equal amplitudes at equally distant points, receiving means selectively responsive to said fields including means for demodulating the received signals, and an indicator responsive to the relative amplitudes of the figure 8 field signal modulations, and to the relative phases of the figure 8 and nondirectional field signal modulations to indicate the bearing and sense of bearing of said receiving means.

9. A system according to claim 1 including receiving means separately responsive to each of the three radio frequencies, and an indicator connected to said receiving means, said indicator including means for indicating, by movements along two coordinates, the magnitude of movements along said coordinates being controlled respectively by the amplitudes of said directional fields, and the sense of movement being indicated by the phase relationship of said direction fields to said nondirectional field.

10. A system according to claim 3 including receiving means separately responsive to each of the three radio frequencies, and an indicator connected to said receiving means, said indicator including means for indicating by movements along two coordinates, the magnitude of movements along said coordinates being controlled respectively by the percentages of modulation of said directional fields, and the sense of movement being indicated by the phase relationship of the modulation of said directional fields to said nondirectional field.

DAVID G. C. LUCK.